United States Patent [19]

Takiguchi et al.

[11] Patent Number: 4,945,964

[45] Date of Patent: Aug. 7, 1990

[54] TIRE WITH DEFINED INNER AND OUTER TREAD RUBBER COMPOSITIONS

[75] Inventors: Eiji Takiguchi; Toshiharu Kikutsugi, both of Tokyo, Japan

[73] Assignee: Bridgestone Corporation, Tokyo, Japan

[21] Appl. No.: 274,686

[22] Filed: Nov. 22, 1988

Related U.S. Application Data

[63] Continuation of Ser. No. 897,952, Aug. 19, 1986, abandoned.

[30] Foreign Application Priority Data

Aug. 27, 1985 [JP] Japan .................. 60-186532

[51] Int. Cl.$^5$ .................................. B60C 1/00
[52] U.S. Cl. .................................. 152/209 R
[58] Field of Search .................. 152/209 R; 524/495, 524/496, 525, 526, 575; 525/236, 237

[56] References Cited

U.S. PATENT DOCUMENTS

| | | | |
|---|---|---|---|
| 3,307,605 | 3/1967 | Bulgin et al. | 152/209 R |
| 3,658,639 | 4/1972 | Wirth | 152/209 R X |
| 3,872,036 | 3/1975 | Todani et al. | 524/526 |
| 4,071,496 | 1/1978 | Kraus et al. | 524/495 |
| 4,385,653 | 5/1983 | Okazaki et al. | 152/209 R |
| 4,396,743 | 8/1983 | Fujimaki et al. | 152/209 R X |
| 4,433,094 | 2/1984 | Ogawa et al. | 152/209 R X |
| 4,616,685 | 10/1986 | Harakon et al. | 152/209 R |
| 4,640,952 | 2/1987 | Takiguchi et al. | 152/209 R X |
| 4,644,988 | 2/1987 | Ahmad et al. | 524/496 X |
| 4,647,625 | 3/1987 | Adnuma et al. | 528/232 |
| 4,791,173 | 12/1988 | Laser | 525/194 X |
| 4,791,178 | 12/1988 | Fujimaki et al. | 152/209 R |

FOREIGN PATENT DOCUMENTS

| | | |
|---|---|---|
| 1957366 | 6/1970 | Fed. Rep. of Germany . |
| 3103970 | 1/1982 | Fed. Rep. of Germany . |
| 3432148 | 3/1985 | Fed. Rep. of Germany . |

OTHER PUBLICATIONS

C. M. Blow, et al., "Rubber Technology and Manufacture", 1971, pp. 170–171.

Werner Hoffman, "Vulcanization and Vulcanizing Agents", 1967, pp. 15–17.

Primary Examiner—Michael W. Ball
Assistant Examiner—Geoffrey L. Knable
Attorney, Agent, or Firm—Sughrue, Mion, Zinn, Macpeak & Seas

[57] ABSTRACT

A tread rubber composition having a high gripping property for use in high-speed running is disclosed, which comprises a diene rubber inclusive of at least one styrene-butadiene rubber, 70–150 parts by weight of carbon black and 30–120 parts by weight of a softening agent per 100 parts by weight of rubber component and has particular crosslinking structure, loss tangent (at 30° C.) and peak temperature at this loss tangent as properties after vulcanization.

2 Claims, 1 Drawing Sheet

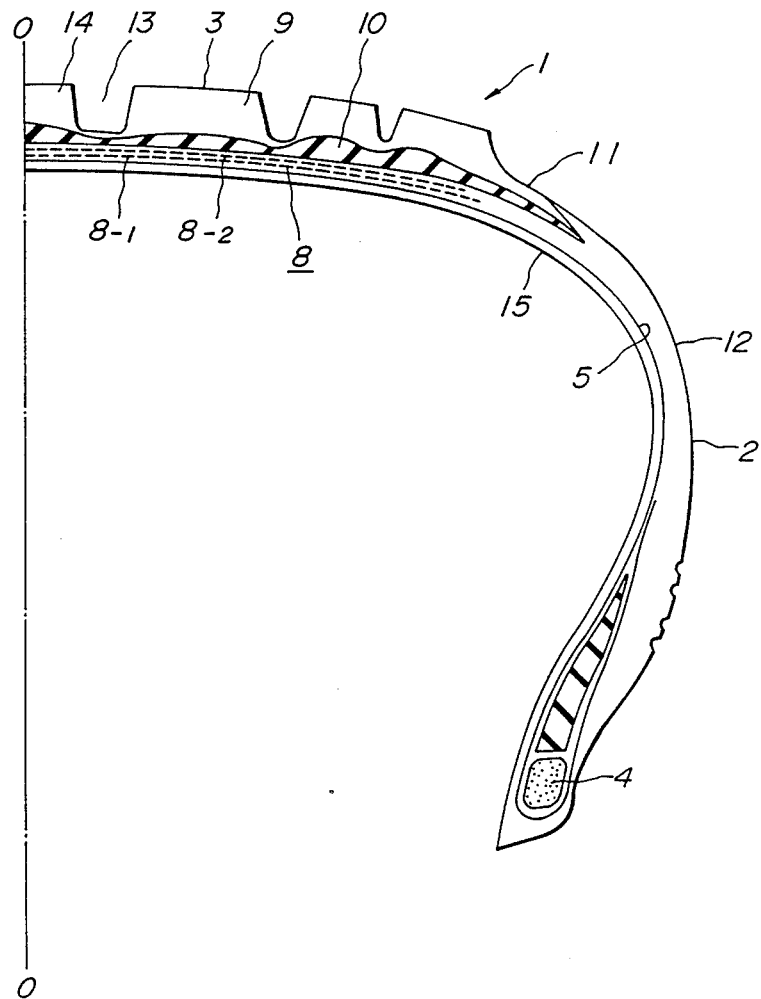

TIRE WITH DEFINED INNER AND OUTER TREAD RUBBER COMPOSITIONS

This is a Continuation of application Ser. No. 06/897,952, filed Aug. 19, 1986, now abandoned.

BACKGROUND OF THE INVENTION

1. Field of the Invention

This invention relates to a tread rubber composition for pneumatic tires, and more particularly to a tread rubber composition suitable for use in pneumatic tires, such as passenger car radial tires, passenger car bias tires, motorcycle tires and so on, which run at a high speed of, for example, more than 200 km/hr, while maintaining a high friction force to the road surface or a high gripping force.

2. Related Art Statement

Lately, studies on high-speed running tires have been carried out in parallel with studies on speeding up of automobiles due to the improvement of roads, particularly express ways. In this connection, studies on tread rubber in the tire have also been made. It is well-known that tread rubbers having a large hysteresis loss during the deformation are used for increasing a friction force between the tread and road surface of a gripping force in the pneumatic tire. In order to increase the hysteresis loss of the tread rubber, styrene-butadiene copolymer rubber having a large bound styrene content is used or a large amount of carbon black is compounded into the tread rubber. However, it is also well-known that as the hysteresis loss of the tread rubber becomes large, the heat generation of the tread rubber becomes high during the running of the tire and hence the breakage of the tread rubber is apt to be caused due to blow-out or the like. Therefore, the feature of obtaining a large gripping force between the tire and road surface and feature of obtaining a high durable performance in high-speed running are conflicting requirements from a viewpoint of plans for the tread rubber because the improvement of one of the features results in the degradation of the other feature. For this reason, it is very difficult to obtain tread rubbers simultaneously satisfying the large gripping force and high durable performance in high-speed running.

SUMMARY OF THE INVENTION

Under the above circumstances, the inventors have made various studies in order to solve the aforementioned problems and to develop tread rubber compositions simultaneously satisfying high durable performance in high-speed running and large gripping force, and noticed that although the hysteresis loss of the tread rubber is forced to be made large for obtaining the large gripping force between the tread and road surface as mentioned above, the high-speed durable performance largely varies in accordance with the crosslinking structure even in the tread rubber having such a large hysteresis loss or a given gripping force, and found that the high durable performance in high-speed running and the large gripping force can simultaneously be achieved without degrading the other general performances as a tread such as fatigue rupture properties, wear resistance and so on by using diene rubber inclusive of styrene-butadiene rubber having a particular structure among the usually used styrene-butadiene copolymer rubbers and compounding specific amounts of carbon black and softening agent thereinto and further specifying the crosslinking structure after vulcanization, and as a result the invention has been accomplished.

According to the invention, there is the provision of a tread rubber composition having a large gripping force suitable for use in high-speed running, comprising 70–150 parts by weight of carbon black and 30–120 parts by weight of a softening agent per 100 parts by weight of diene rubber including at least one styrene-butadiene rubber wherein the sum of the percent by weight of the styrene portion in the total styrene-butadiene rubber and the percent by weight of the vinyl portion in the butadiene unit of the total styrene-butadiene rubber is not less than 45 and having a ratio of monosulfide crosslinking structure to total crosslinking structure of not less than 25 mol %, a loss tangent (tan δ) at 30° C. of not less than 0.35 and a peak temperature at this tan δ of not lower than −25° C. as properties after vulcanization.

BRIEF DESCRIPTION OF THE DRAWING

The invention will be described with reference to the accompanying drawing, wherein:

A single FIGURE is a schematically radial half section of an embodiment of the pneumatic tire according to the invention.

DESCRIPTION OF THE PREFERRED EMBODIMENTS

In the tread rubber composition according to the invention, the diene rubber including at least one styrene-butadiene rubber, wherein the sum of the percent by weight of the styrene portion in the total styrene-butadiene rubber and the percent by weight of the vinyl portion in the butadiene unit of the total styrene-butadiene rubber is not less than 45, is used as a rubber component. In this case, the amount of the total styrene-butadiene rubber contained in the diene rubber is preferable within a range of 50–100% by weight. Moreover, the styrene-butadiene rubber according to the invention may include derivatives of styrene-butadiene rubber such as α-methyl styrene-butadiene rubber, nuclear substituted α-methyl styrene-butadiene rubber and so on.

When wherein the sum of the percent by weight of the styrene portion in the total styrene-butadiene rubber and the percent by weight of the vinyl portion in the butadiene unit of the total styrene-butadiene rubber is not less than 45 the sufficient gripping force can not be obtained.

When a blend of the above styrene-butadiene rubber and the other rubber is used as the diene rubber, the rubber to be blended is preferably at least one of polybutadiene rubber, high-vinyl polybutadiene rubber, natural rubber, polyisoprene rubber, butyl rubber, halogenated butyl rubber and so on. The blending ratio of the styrene-butadiene rubber to the other rubber is preferable to be within a range of 70/30–100/0. When the blending ratio of the other rubber is more than 30, the sufficient gripping property against road surface at high speed can not highly be maintained.

In the tread rubber composition according to the invention, 70–150 parts by weight, preferably 70–120 parts by weight of carbon black and 30–120 parts by weight, preferably 30–100 parts by weight of the softening agent are compounded per 100 parts by weight of the rubber component. When the amount of carbon black is less than 70 parts by weight and the amount of the softening agent is less than 30 parts by weight, it is difficult to obtain a satisfactory gripping force and also the fatigue resistance in last running stage is degraded to cause cracking and the like, while when the amount of carbon black is more than 150 parts by weight and the amount of the softening agent is more than 120 parts by weight, the high-speed durability and service durability are unfavorably deteriorated.

The kind of carbon black may be selected in accordance with the desired level of the gripping force. Carbon black having an average particle size of not more than 30 m$\mu$, preferably not more than 26 m$\mu$, more particularly not more than 22 m$\mu$ as measured by an electron microscope are used for providing a large gripping force, which correspond to commercially available carbon blacks of HAF class, ISAF class, SAF class and so on viewing from the above mentioned average particle size. If the amount of carbon black is fixed, the smaller the particle size, the larger the hysteresis loss, and hence the larger the gripping force can be obtained, but the heat generation becomes larger during the running of the tire, so that insufficient high-speed performances are obtained. In the composition according to the invention providing sufficient high-speed performances, carbon blacks having a small particle size, such as carbon black of ISAF class, carbon black of SAF class and carbon black having an average particle size smaller than SAF class are predominantly used.

As the softening agent, use may be made of those used in the usual rubber compounding, which include aromatic softener, naphthenic softener, paraffinic softener, ester softener and a mixture thereof.

The tread rubber composition according to the invention is used by vulcanizing with a vulcanizing agent inclusive of sulfur and a vulcanization accelerator. After the vulcanization, the resultant crosslinking structure includes monosulfide crosslinking bond, disulfide crosslinking bond, polysulfide crosslinking bond and so on. In the tread rubber composition according to the invention, the monosulfide crosslinking structure is not less than 25 mol %, preferably not less than 30 mol %, more particularly not less than 40 mol % of the total crosslinking structure. When it is less than 25 mol %, it is difficult to obtain satisfactory high-speed performances.

In general, as the amount of monosulfide crosslinking bond becomes larger, the fatigue rupture properties are degraded to unfavorably cause cracking or the like in the tread rubber at the last running stage of the tire. According to the invention, however, it is surprising that the amount of monosulfide crosslinking structure can be made not less than 25 mol % of the total crosslinking structure and the desirable performances can be maintained up to the last running stage without degrading the fatigue rupture properties only when the specified amounts of carbon black and softening agent are combined in the tread rubber.

In the tread rubber of the pneumatic tire, the crosslinking structure gradually changes from polysulfide bond to disulfide bond and then from disulfide bond to monosulfide bond due to heat or mechanical repetitive strain during the running. On the contrary, the ratio of monosulfide crosslinking structure to total crosslinking structure of not less than 25 mol % defined in the invention means a value prior to the actual use of the tire. The feature of more increasing the amount of monosulfide crosslinking structure can easily be achieved by using a vulcanization system inclusive of a thiuram series vulcanizing agent such as tetramethylthiuram monosulfide, tetramethylthiuram disulfide, tetraethylthiuram disulfide or the like. Furthermore, a vulcanization system inclusive of a sulfur donor vulcanizing agent such as morpholine disulfide, alkylphenol disulfide or the like may be used. In this case, the vulcanizing agent is added in an amount of 0.05-2.0 parts by weight, preferably 0.1-1.5 parts by weight.

The tread rubber composition according to the invention after the vulcanization has tan $\delta$ at 30° C. of not less than 0.35 and a peak temperature at such tan $\delta$ of not lower than −25° C. When the tan $\delta$ at 30° C. is less than 0.35 and the peak temperature at this tan $\delta$ is lower than −25° C., it is difficult to obtain a sufficient gripping force.

In addition to the aforementioned components, the tread rubber composition according to the invention may properly contain additives such as antioxidant, plasticizer and so on.

As mentioned above, the tread rubber composition according to the invention contains the specific amounts of carbon black and softening agent based on the rubber component as an essential component and has a specified ratio of monosulfide crosslinking structure, tan $\delta$ at 30° C. of not less than 0.35 and peak temperature at this tan $\delta$ of not lower than −25° C. as properties after vulcanization, so that the large gripping force and the high durability in high-speed running can simultaneously be achieved without degrading general requirements for tread such as fatigue rupture properties, wear resistance and so on.

The invention will be described with respect to the following examples and comparative examples.

EXAMPLES 1-9, COMPARATIVE EXAMPLES 1-4

Rubber compositions of Examples 1-9 and Comparative Examples 1-4 were prepared according to a compounding recipe as shown in the following Table 1, and then the properties thereof were measured to obtain results as shown in Table 1. Moreover, each of styrene-butadiene rubbers A, B and C and butadiene rubber (BR01) had the following microstructure.

| Microstructure | Styrene-butadiene rubber A | Styrene-butadiene rubber B | Styrene-butadiene rubber C | Butadiene rubber BR01 |
|---|---|---|---|---|
| cis-1,4(%) | 15 | 10 | 18 | 95 |
| trans-1,4(%) | 66 | 73 | 34 | 3 |
| vinyl (%) | 19 | 17 | 48 | 2 |
| Styrene (%) | 23.5 | 35.0 | 23.6 | — |
| vinyl + styrene | 42.5 | 52.0 | 71.6 | 2 |

Then, a tire comprising a tread composed of each rubber composition in Table 1 and having a size of 225/50 R16 was manufactured and mounted onto a rim of 8J-16 under an internal pressure of 3.1 kg/cm$^2$. Thereafter, the gripping property against road surface, high-speed durability and service durability of the tire were also measured to obtain results as shown in Table 1.

TABLE 1

| | Example | | | | | | | | | Comparative Example | | | |
|---|---|---|---|---|---|---|---|---|---|---|---|---|---|
| | 1 | 2 | 3 | 4 | 5 | 6 | 7 | 8 | 9 | 1 | 2 | 3 | 4 |
| Styrene-butadiene rubber A | — | — | — | — | — | — | — | — | 25 | 100 | 100 | — | — |
| Styrene-butadiene rubber B | 100 | 100 | — | 100 | 100 | 100 | 90 | 80 | 60 | — | — | 100 | 100 |
| Styrene-butadiene rubber C | — | — | 100 | — | — | — | — | — | — | — | — | — | — |
| Butadiene rubber | — | — | — | — | — | — | 10 | — | — | — | — | — | — |
| Natural rubber | — | — | — | — | — | — | — | 20 | — | — | — | — | — |
| Chlorobutyl rubber | — | — | — | — | — | — | — | — | 15 | — | — | — | — |
| Carbon black (HAF) | 80 | — | — | — | — | — | — | — | — | 60 | 80 | — | — |
| Carbon black (ISAF) | — | 80 | 80 | 80 | 80 | 80 | 75 | 80 | 80 | — | — | 40 | 80 |
| Aromatic oil | 40 | 40 | 40 | — | 40 | 40 | 35 | 40 | 40 | 20 | 40 | — | 40 |
| Naphthenic oil | — | — | — | 40 | — | — | — | — | — | — | — | — | — |
| Stearic acid | 1 | 1 | 1 | 1 | 1 | 1 | 1 | 1 | 1 | 1 | 1 | 1 | 1 |
| Antioxidant (IPPD) | 1 | 1 | 1 | 1 | 1 | 1 | 1 | 1 | 1 | 1 | 1 | 1 | 1 |
| Zinc white | 3 | 3 | 3 | 3 | 3 | 3 | 3 | 3 | 3 | 3 | 3 | 3 | 3 |
| Vulcanization accelerator DPG *1 | — | — | — | — | — | — | — | — | — | 0.5 | — | — | 0.5 |
| Vulcanization accelerator DM *1 | 0.5 | 0.5 | 0.5 | 0.5 | 0.5 | 0.5 | 0.5 | 0.45 | 0.4 | 1.0 | 0.5 | 0.5 | 1.0 |
| Vulcanization accelerator TT *1 | 0.5 | 0.5 | 0.5 | 0.5 | — | 0.4 | 0.6 | 0.5 | 0.6 | — | 0.5 | 0.5 | — |
| Vulcanization accelerator TS *1 | — | — | — | — | 0.7 | — | — | — | — | — | — | — | — |
| Vulnoc R *2 | — | — | — | — | — | 0.5 | — | — | — | — | — | — | — |
| Sulfur | 1.0 | 1.3 | 1.2 | 1.3 | 1.0 | 0.5 | 1.3 | 1.3 | 1.3 | 1.5 | 1.0 | 1.0 | 1.5 |
| Styrene + vinyl | 52.0 | 52.0 | 71.6 | 52.0 | 52.0 | 52.0 | 52.0 | 52.0 | 49.2 | 42.5 | 42.5 | 52.0 | 52.0 |
| Crosslinking structure $v_M$ (mol %) | 54.0 | 53.7 | 52.4 | 53.8 | 57.4 | 54.3 | 53.2 | 53.4 | 53.0 | 20.8 | 53.6 | 52.3 | 21.4 |
| Crosslinking structure $v_P$ (mol %) | 46.0 | 46.3 | 47.6 | 46.2 | 42.6 | 45.7 | 46.8 | 46.6 | 47.0 | 79.2 | 46.4 | 47.7 | 78.6 |
| Loss tangent peak temperature (°C.) | −19 | −19 | −7 | −20 | −19 | −19 | −21 | −24 | −22 | −32 | −32 | −19 | −19 |
| Loss tangent (30° C.) | 0.485 | 0.514 | 0.521 | 0.452 | 0.500 | 0.518 | 0.398 | 0.501 | 0.525 | 0.291 | 0.315 | 0.301 | 0.512 |
| Blow temperature (°C.) | 245 | 247 | 238 | 246 | 249 | 246 | 249 | 243 | 245 | 191 | 241 | 243 | 188 |
| Gripping property | 170 | 180 | 190 | 160 | 180 | 190 | 165 | 176 | 191 | 100 | 105 | 103 | 175 |
| High-speed durability | 130 | 130 | 125 | 120 | 130 | 130 | 130 | 128 | 127 | 100 | 125 | 130 | 95 |
| Service durability | o | o | o | o | o | o | o | o | o | o | o | X | o |

Note
*1 DPG: diphenyl guanidine
DM: dibenzothiazyl disulfide
TT: tetramethylthiuram disulfide
TS: tetramethylthiuram monosulfide
*2 Vulnoc R: 4,4′-dithio-bis-dimorpholine

Evaluation Method (1) Crosslinking structure (Network density):
  $v_T$: Total network was measured according to Flory-Rhener equation described by P. J. Flory in *J. Chem. Phys*, vol. 18, 1950, page 108.
  $v_M$: The monosulfide network density was measured by the above method after the treatment according to a process described in *Journal of the Society of Rubber Industry, Japan*, vol. 39, 1966, page 385.
  $v_P$: The polysulfide network density was determined from a calculation of $v_T 14\, v_M$.

(2) Loss tangent (tan δ):
  The loss tangent of a specimen having a width of 5 mm, a thickness of 2 mm and a length of 20 mm was measured at a temperature of 30° C., a frequency of 50 Hz and a dynamic strain of 1% using a viscoelastomeric spectrometer made by Iwamoto Seisakusho.

(3) Loss tangent peak temperature:
  The measurement was carried out at a dynamic strain of 0.1%.

(4) Blow-out test:
  The measurement was performed according to a method of ASTM D-632-58 using a Goodrich flexometer. Test conditions were temperature inside tank of 120° C., frequency of 1800 rpm, load of 62 pounds, strain of 22.5% and sample of 30 mm in diameter and 25.4 mm in height.

(5) Gripping property:
  The gripping property was totally evaluated from a measured value of lap time and feeling at high-speed running (traction and braking abilities, handling response, gripping against road surface in the cornering and controllability over slip limit) by actually running on a circuit (2.04 km).

(6) High-speed durability:
  After the above test, the appearance of the tire was observed, and the high-speed durability was represented by an index on the basis that the tire of Comparative Example 1 is 100.

(7) Service durability:
  After the tire comprising a two segment type tread was actually run on rough road consisting of 70% of unpaved road and 30% of good road over a distance of 30,000 km, the appearance of the tread was visually evaluated on the basis of the rubber composition of Comparative Example 1.

o . . . no crack, x . . . cracking

From the results of Table 1, it is apparent that the tread rubber compositions satisfying the requirements according to the invention exhibit high gripping property and high-speed durability as compared with the rubber compositions of the comparative examples when such a rubber composition is used as a tread of a tire.

Then, the invention will be described with respect to an embodiment that the rubber composition according to the invention is applied to an outer rubber layer in a tread of a composite structure of a pneumatic radial tire with a size of 225/50 R 16 as shown in the single figure.

In the single FIGURE, a tire 1 comprises a pair of sidewalls 2 and a tread 3 toroidally extending therebetween. In the single FIGURE, the left radial half section is omitted, but the left and right half sections are of course symmetrical to each other with respect to equatorial plane O—O.

In an inward edge portion of the sidewall 2 in the radial direction of the tire is embedded a bead ring 4 according to the usual manner. A carcass 5 is extended between the bead rings 4 to reinforce the sidewalls and tread as a whole.

The carcass 5 is composed of at least one rubberized ply containing organic fiber cords therein. In this embodiment, the carcass 5 is composed of two rubberized plies each containing rayon cords of 1650 d/2 arranged at an angle of 90° with respect to the equatorial plane O—O.

About a crown portion of the carcass 5 is superimposed a belt 8 comprising inextensible cords. In this embodiment, the belt 8 is composed of two belt layers 8-1 and 8-2 each containing steel cords of 1×5 construction arranged at an inclination angle of 22° with respect to the equatorial plane O—O, the cords of which layers being crossed with each other. Further, a ribbon-like body (not shown) obtained by arranging five steel cords of 1260 d/2 in parallel with each other is spirally wound two times around the outer periphery of the belt 8 over its whole width in parallel with the equatorial plane for reinforcing the belt.

The tread 3 has a composite structure composed of an outer rubber layer 9 directly contacting with road surface during the running and an inner rubber layer 10 supporting the rubber layer 9 on the belt 8.

The outer rubber layer 9 is desirable to have a loss tangent (tan δ) of not less than 0.45, a modulus at 100% elongation of 12-23 kg/cm² and a blow temperature of 210°-230° C. On the other hand, the inner rubber layer 10 is desirable to have a loss tangent (tan δ) of not less than 0.37 but smaller than that of the outer rubber layer and a modulus at 100% elongation and a blow temperature higher than the respective upper limits of the outer rubber layer.

Moreover, dynamic modulus (E') is 70-150 kg/cm² in the outer rubber layer 9 and 100-250 kg/cm² in the inner rubber layer 10.

As to the thickness ratio of the inner rubber layer to the outer rubber layer, when an average thickness of the outer rubber layer 9 is 1, an average thickness of the inner rubber layer 10 is within a range of 0.15-0.35. In this embodiment, the thickness ratio of inner rubber layer to outer rubber layer is 0.2. The reason why the thickness of each of the inner and outer rubber layers is defined by the average thickness is due to the fact that when the tread 3 is constructed with plural ribs 14 divided by plural grooves 13, the joint face between the outer and inner rubber layers 9, 10 takes a wave form as shown in the single FIGURE.

In this embodiment, the outer rubber layer 9 is piled on the inner rubber layer 10 over substantially a whole width of the tread, and the each widthwise edge of the resulting assembly is extended in the form of a wedge into a flexibility-rich rubber portion 12 of the sidewall 2 at a position of a shoulder 11. Moreover, numeral 15 is an inner liner rubber having an air impermeability.

EXAMPLE 10, COMPARATIVE EXAMPLE 5

Two test tires having the structure as illustrated in the single FIGURE were manufactured, and then the gripping property, cornering stability and durability thereof were measured to obtain results as shown in the following Table 2 together with a compounding recipe of each of the outer and inner rubber layers used for the tread.

TABLE 2

|  | Comparative Example 5 | | Example 10 | |
| --- | --- | --- | --- | --- |
|  | Outer rubber layer 9 | Inner rubber layer 10 | Outer rubber layer 9 | Inner rubber layer 10 |
| Styrene-butadiene rubber A | — | 100 | — | 100 |
| Styrene-butadiene rubber B | 100 | — | 100 | — |
| Carbon black (HAF) | — | 90 | — | 90 |
| Carbon black (ISAF) | 85 | — | 85 | — |
| Aromatic oil | 45 | 35 | 45 | 35 |
| Stearic acid | 1 | 1 | 1 | 1 |
| Antioxidant (IPPD) | 1 | 1 | 1 | 1 |
| Zinc white | 3 | 3 | 3 | 3 |
| Vulcanization accelerator DPG | 0.7 | 0.6 | — | — |
| Vulcanization accelerator DM | 0.8 | 1.2 | 0.5 | 0.6 |
| Vulcanization accelerator TT | — | — | 0.5 | 0.6 |
| Sulfur | 1.5 | 1.5 | 1.0 | 1.3 |
| Dynamic modulus (kg/cm²) | 130 | 173 | 132 | 180 |
| Crosslinking structure $v_M$ (mol %) | 21.4 |  | 53.7 |  |
| Loss tangent (30° C.) |  | 0.42 | 0.51 | 0.47 |
| Loss tangent peak temperature (°C.) | −19 |  | −19 |  |
| Shore A hardness 100% modulus (kg/cm²) | 61 | 66 | 63 | 68 |
| Blow temperature (°C.) | 193 | 212 | 228 | 244 |
| High-speed performances  Gripping property |  | 100 | | 180 |
| Cornering stability (Steering response) |  | 100 | | 150 |
| High-speed durability (Block chipping) |  | 100 | | 120 |

As mentioned above, according to the invention, the high-speed performances of the extra-flat radial tire can considerably be improved.

What is claimed is:

1. In a pneumatic radial tire comprising a pair of sidewalls, a tread toroidally extending between the sidewalls, a carcass composed of at least one rubberized ply containing organic fiber cords arranged in a direction substantially perpendicular to the equatorial plane of the tire for reinforcing the sidewalls and tread, and a belt composed of at least one inextensible cord layer and superimposed about a crown portion of the carcass, the improvement wherein said tread has a composite structure of an outer rubber layer located outward in the radial direction of the tire and an inner rubber layer located inward in the radial direction, and said outer rubber layer is composed of a vulcanized tread rubber composition comprising:

(A) 70-150 parts by weight of carbon black,
    (B) 1.5-2.0 parts by weight in total of sulfur and a thiuram series vulcanizing agent, provided that the amount of said thiuram series vulcanizing agent is 0.3–1.0 part by weight, and (C) 30–120 parts by weight of a softening agent, per 100 parts by weight of a diene rubber inclusive of at least one styrene-butadiene rubber, wherein the sum of the percent by weight of the styrene portion in the total styrene-butadiene rubber and the percent by weight of the vinyl portion in the butadiene unit of the total styrene-butadiene rubber is not less than 45, wherein said outer rubber layer has a loss tangent at 30° C. of at least 0.45, a modulus at 100% elongation of 12–23 kg/cm$^2$ and a blow temperature of 210°–230° C. and said inner rubber layer has a loss tangent of not less than 0.37 at 30° C. but smaller than that of said outer rubber layer, a modulus at 100% elongation and blow temperature higher than the respective upper limits of those of said outer rubber layer, and wherein the outer rubber layer has a ratio of monosulfide crosslinking structure to total crosslinking structure of not less than 25 mol % prior to actual use of the tire, and a loss tangent peak temperature of not lower than −25° C. as properties after vulcanization.

2. The pneumatic radial tire according to claim 1, wherein the amount of said thiuram series vulcanizing agent is 0.4–0.7 part by weight.

* * * * *